United States Patent [19]

Fratzer et al.

[11] 4,388,275

[45] * Jun. 14, 1983

[54] APPARATUS CONTAINING A CARRIER MATRIX FOR CATALYSTS

[75] Inventors: Gerhard Fratzer; Bernhard Beck, both of Rheinfelden; Erwin Dold, Wyhlen; Hans Klebe, Rheinfelden, all of Fed. Rep. of Germany

[73] Assignee: Degussa Aktiengesellschaft, Frankfurt, Fed. Rep. of Germany

[*] Notice: The portion of the term of this patent subsequent to Jun. 2, 1998, has been disclaimed.

[21] Appl. No.: 229,608

[22] Filed: Jan. 23, 1981

Related U.S. Application Data

[62] Division of Ser. No. 102,581, Dec. 11, 1979, Pat. No. 4,271,044.

[30] Foreign Application Priority Data

Dec. 12, 1978 [DE] Fed. Rep. of Germany ....... 2853547

[51] Int. Cl.³ .......................... B01J 35/04; F01N 3/22

[52] U.S. Cl. .................................. 422/180; 252/472; 252/477 R; 422/222; 423/213.5

[58] Field of Search ........................... 252/472, 477 R; 422/180, 222; 423/213.2, 213.5

[56] References Cited

U.S. PATENT DOCUMENTS

| | | | |
|---|---|---|---|
| 3,966,646 | 6/1976 | Noakes et al. | 252/477 R |
| 4,162,993 | 7/1979 | Retallick | 252/477 R |
| 4,225,561 | 9/1980 | Torres | 422/180 X |

*Primary Examiner*—W. J. Shine
*Attorney, Agent, or Firm*—Beveridge, DeGrandi & Kline

[57] ABSTRACT

Monolithic carrier matrixes are formed from high grade steel, consisting of alternating smooth and corrugated layers of sheet metal and/or screen cloth, which may be combined with layers of smooth screen cloth or of smooth or corrugated sheet metal, wherein the layers may be coated on their surfaces with a catalysis-promoting carrier material. These carrier matrixes may be used to produce catalysts for the purification of exhaust gases.

6 Claims, 3 Drawing Figures

APPARATUS CONTAINING A CARRIER MATRIX FOR CATALYSTS

This is a division, of application Ser. No. 102,581 filed Dec. 11, 1979, now U.S. Pat. No. 4,271,044.

INTRODUCTION AND BACKGROUND OF THE INVENTION

The invention pertains to a carrier matrix for catalysts with cross-flow effect, as well as with enlarged surfaces and improved retaining capacity as compared to catalysis-promoting metal oxides present in dipping dispersions, comprising superposed layers of high temperature and scale resistant steel; such a carrier matrix coated with metal oxide; and a process for the production of the last mentioned matrix. Another object of the invention is the use of these matrixes for the production of catalysts.

The pollutants, especially of exhaust gases from the internal combustion engines of the continuously increasing number of motor vehicles, represent a considerable danger for the health of humans, animals and plants. They are already delimited in a few countries by legal determination of maximally permissible concentrations of pollutants. Among the methods proposed and already practiced for the solution of these air pollution problems, the exhaust gas purification processes have become most important. The greatest demands are made of the catalyst required for this purpose regarding heating-up behavior, effectiveness, endurance activity and mechanical stability. For example, in case of use in motor vehicles, they must become active at the lowest possible temperatures and they must guarantee operation, for a long time and in all pertinent ranges of temperature and volume rates to obtain a high percentage conversion of the pollutants to be converted (especially hydrocarbons, carbon monoxide and nitric oxides) into harmless oxidation and reduction products, such as carbon dioxide, steam and nitrogen. Because of the great mechanical strains during continuous operation they must have a sufficient mechanical stability and must not lose it even in the event of extended overheating as might possibly occur as a result of being acted upon by unburned fuel, for example in the event of ignition failure in one or more cylinders. Therefore, they must in this case satisfy a series of conditions which are difficult to fulfill simultaneously or are contradictory to one another.

Hitherto, monolithic carrier catalysts have been used above all next to bulk-bed catalysts, i.e., mouldings or extrudates of carrier catalysts or interspersant or mixed catalysts. They consist of an inert, low-surface, ceramic skeleton of, for example, cordierite, mullite or α-aluminum oxide as structural reinforcer, on which a thin, mostly high surface layer of heat resistant, mostly oxidic carrier material, such as aluminum oxide of the so-called gamma-series is applied, which latter in turn carries the actual catalytically active component.

This may be of noble metal, noble metal compounds or non-noble metal compounds. From the group of the noble metals, for example, platinum, palladium, rhodium, ruthenium, iridium, gold and silver may be used. As non noble metal compounds for example, the oxides of copper, chrome, manganese, iron, cobalt, nickel and their combinations as for example, copper chromite are contemplated. Other variations are included developed by combining noble metals or their compounds with non-noble metals or their compounds, or else non-noble metals or their compounds with noble metals or their compounds. In many cases, small quantities of other elements are still added to the active component, such as from the group of the alkaline-earth metals, e.g., magnesium, calcium, strontium or barium, from the group of the rate earths, e.g. samarium, lanthanum, cerium, or from the IV group of the periodic system, e.g. titanium, zirconium or tin, as so-called promoters for the improvement of certain characteristics of the system.

The poor heat conductivity and sensitivity to mechanical shock and thermal overheating turned out to be a considerable disadvantage of the catalysts with ceramic structural reinforcers, especially the monolithic honeycomb catalysts made from cordierite, millite or α-aluminum oxide. Thus the shocks occurring in travel as a result of intermittent impulses of the exhaust gas column, the vibrations of the motor and movements of travel in connection with peak temperatures have a shattering and crumbling effect on the ceramics. In the event of a thermal overheating taking place in the narrow confines of space of the catalysts, a sintering, melting and baking of the structural reinforcer being present, in the form of monoliths or bulk bodies, with its surface coatings, may occur resulting in partial or complete deactivation.

It has turned out furthermore that the attachment of such ceramic honeycombs in metal housings is difficult because of the variation in heat expansion of ceramics and metal, and requires expensive preparations in construction, in order to guarantee an elastic and gastight support of the honeycombs at given the operating temperatures the latter changing continually within the possible scope of $-30°$ and $+1000°$ C.

Therefore, all sorts of efforts were made, for finding better suitable replacement materials for the catalysts based on a ceramic base and in searching for a more favorable spacial configuration for them.

Thus, as early as in the German OS No. 23 02 274 a carrier matrix for a catalyst reactor for the purification of exhaust gas in internal combustion engines had been described, which is made of alternately disposed corrugated and smooth high temperature resistant sheet steel which is coated with a catalyticaly active metal, such as platinum or palladium or a metal oxide such as copper oxide, nickel-oxide or something similar. Herein it is said to be also known to use metal carriers from materials with a high nickel content (Monel), whereby the nickel, after conversion into oxide shows catalytic activity. The above-mentioned German OS proposes, among other things, to coat the sheets of steel with copper or nickel and to oxidize the coating subsequently or to cover it directly with a catalytically active metal oxide.

In addition, the German OS No. 24 40 664 describes a catalyst built up of a maximum of four layers, wherein a carrier capable of resisting heat and oxidation, made of an iron alloy in the form of an extended sheet wound up in a roll, is coated with a porous coating, containing oxygen, which is to carry the catalyst layer disposed thereon, and is obtained preferably by thermal, chemical or electrolytic surface oxidation of an iron alloy, containing aluminum, with possible subsequent reinforcement by means of aluminum oxide, applied from outside.

Disadvantages of such metallic structural reinforcers for catalyst materials are to be seen in the fact that they have a limited geometrical surface, which limits the retaining capacity with respect to catalysis promoting, high surface, heat resistant metal oxides such as $\gamma$-$Al_2O_3$ made with dipping dispersions, to the point that one requires several repetitions of the dipping process for achieving a coating of said oxides, sufficiently strong for impregnation with the actual catalytically active component. Since the known carrier matrixes are traversed by separated flow channels, the gas mixture that is to be converted comes into contact with the catalyst material only in the form of longitudinally flowing gas columns enclosed by the walls of the flow channels; as a result of that, in the case of a predetermined gas-flow velocity, a certain often overly great minimum length of the matrix is required, in order to achieve a satisfactory mass transfer and tied to that a sufficient degree of conversion. Finally heat gradients occur between the individual longitudinally running, discrete reaction zones, for example on the basis of locally more or less variable thickness of layers and activities of the catalyst material, which can be balanced out only by way of the specific heat conductivity of the wall material of the channel.

SUMMARY OF THE INVENTION

The invention is based on the task of creating carrier matrixes for catalysts, traversed by flow channels, consisting of superposed layers of high-temperature-resistant and scale resistant steel, which permit a cross-flow between the individual flow channels, which have a geometrically enlarged surface and show an improved retaining capacity, as compared to catalysis-promoting carrier materials present in dipping dispersions. Another feature of the invention extends to the development of variations of these matrixes, directly impregnable with catalyst material and provided with catalysis-promoting metal oxide coatings, as well as a process for their production. An additional goal of the invention is the opening up to suitable areas of application for the matrixes of the invention.

BRIEF DESCRIPTION OF THE DRAWINGS

FIG. 3 shows a mounted carrier matrix according to the invention with bridge security against shifting of the layers.

DETAILED DESCRIPTION OF THE INVENTION

Figure 1A:
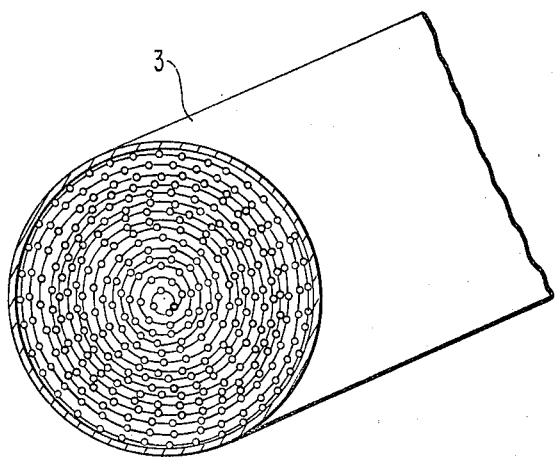
FIG. 1 shows a carrier matrix formed of smooth screen cloth, according to the invention, with woven-in supporting wires.

One object of the invention is to provide a carrier matrix for catalysts with cross-flow effect, traversed by flow channels, having enlarged geometric surface and improved retaining capacity as compared to catalysis promoting carrier materials present in dipping dispersions and comprising superposed alternately smooth and corrugated layers of high temperature and scale resistant steel. As a result, the matrix is characterized in that a layer of corrugated sheet steel alternates with a layer of smooth screen cloth or a layer of smooth sheet metal alternates with a layer of corrugated screen cloth or also a layer of corrugated screen cloth alternates with a layer of smooth screen cloth.

The channels, through which the exhaust gas to be purified flows regularly, permit a cross-flow to adjacent channels by way of apertures of the screen cloth, without any additional back pressure being built up thereby. The cross stream effect, by making possible a certain gas exchange also between adjacent channels, will rather produce an improved catalytic conversion effect.

Through the use of layers of screen cloth in the matrixes, there results a considerable enlargement of the surface, which is greatest, whenever webs of screen cloth in corrugated and smooth form are used. The enlarged surface raises the retaining capacity as compared to particles of dipping dispersions or slurries and permits a reduction of the processing steps in case of coating the matrixes with carrier and/or catalyst substances in the washcoat process. Based on the improved gas exchange, a reduction of the dimensions of the carrier matrix as compared to traditional carrier matrixes is possible.

These advantageous effects may be further influenced and optimized, especially by way of dimensioning the components forming the smooth and corrugated sheet metal or screen cloth coatings. It turned out to be advantageous, that the sheet metal used has a wall thickness below 0.15 mm and the screen cloth has a mesh size of 0.18–0.025, preferably 0.1–0.05, especially 0.073 mm and a wire gauge of 0.15–0.025, preferably 0.1–0.05, especially 0.07 mm and the individual flow channels formed by the smooth and corrugated layers have a cross section of below 1.5 $mm^2$.

For actual operations, especially for the catalytic purification of the exhaust gases of internal combustion engines, an embodiment is preferred, in which the smooth and corrugated layers are wound up into a cylinder with spiral shaped cross section, having numerous flow channels.

An alternative in construction to the above-described matrix relates to an embodiment which layers of high temperature and scale resistant steel are provided likewise disposed in superposition, said embodiment however, having an independent significance insofar as the layers consist of a smooth screen cloth into which supporting wires of a larger cross section than the screen cloth are woven on or in at parallel distances in the direction of the desired flow channels, or else in that layers of smooth screen cloth or smooth or corrugated sheet metal alternate with layers of smooth screen cloth with supporting wires woven correspondingly in or on. A particularly useful embodiment for the practice of the invention resides in a web of screen cloth provided with supporting wires which is wound up into a cylinder with spiral shaped cross section, having numerous flow channels. However, it is also possible to wind up the web of screen cloth provided with the supporting wires, with an additional smooth or corrugated web of screen cloth or sheet metal, into a cylinder with spiral shaped cross section, having numerous flow channels.

The screen cloth should represent a web with a mesh size of 0.18–0.025, preferably 0.1–0.05, especially of 0.073 mm and with a wire gauge of 0.15–0.025, preferably of 0.1–0.05, especially of 0.07 mm, and the supporting wires should have a gauge of at least 0.2 mm, preferably of 0.4–1.5 mm, whereby the pertinent gauge is determined by the desired dimensions of the flow channels and on the wire gauge of the screen cloth. Moreover, it turned out to be effective that the individual flow channels formed by the spacing woven-in supporting wires have a cross-section of below 5 $mm^2$ and that the supporting wires in the plane of the screen cloth web are at least 1 mm and at most 5 mm apart.

For both previously described types of construction of the novel carrier matrix, particularly sheet metals, screen cloths and support wires are suitable which consists of an alloy of iron, chromium, aluminum and possibly cerium or yttrium. For the catalytic purification of the exhaust gases of internal combustion engines, a carrier matrix proved to be suitable which consists of an alloy of 15% by weight of chromium, 5% by weight of aluminum, the rest of iron. An alloy of up to 15% by weight of chromium, 0.5–12% by weight of aluminum, 0.1–3% by weight of cerium or yttrium, the rest of iron, is advantageous. Such alloys may be provided with a superficial aluminum oxide layer by heating in an oxidizing gas, which layer in some cases has a favorable influence on the adhesion of catalyst material to be applied.

Another development which may be used for both described types of construction of the carrier matrix of the invention, resides in the individual layers on the periphery and/or front side being spot-welded or welded together mutually or else the last layer with the preceding layer, for which an electron-beam welding is particularly favorable.

The invention pertains furthermore to a carrier matrix of the described construction type, coated with a customary carrier material for catalysts and impregnable directly with solutions of active catalyst metals. At the same time, the layers on their surface are coated with a catalysis-promoting carrier material, mostly a metal oxide of a high surface. These carrier matrixes of the invention coated with carrier material are preferably disposed in practical use as angular cylinders with spiral-shaped cross sections clamped in a steel jacket and/or welded in it. Another possibility of the fixation of the individual layers resides in using mooring rings or holding bars which are, for example, disposed firmly on the inside diameter of a cylindrical steel jacket or housing, or on the converter cones, i.e. they are welded together with one of the two construction units. As a result, one will prevent any shifting of the individual wound up spiral shaped layers in the longitudinal direction of their axis.

The production of the carrier matrixes, impregnable directly with catalyst materials is accomplished in a process, wherein the surface of the smooth and corrugated layers or the web of screen cloth provided with supporting wires is coated with a catalysis-promoting carrier material prior to winding it into a cylinder.

The application of the catalysis-promoting carrier material takes place according to known coating processes. For this purpose a heat resistant, catalysis-promoting carrier material of relatively high specific surface is applied, by bringing the surfaces to be coated into contact with an aqueous dispersion of the carrier material or with the solution of a salt, which may be thermally converted into the carrier material and after removal of excess dispersion or solution and subsequent drying, calcining at temperatures mostly above 450° C., and wherein these operating steps are possibly carried out several times. Basically, any heat resistant carrier materials customary for catalysts may be used. Thus the surfaces to be coated may be brought into contact with an aqueous dispersion of at least one compound from the group of oxides of Mg, Ca, Sr, Ba, Al, Sc, Y, the lanthanides, the actinides, Ga, In, Tl, Si, Ti, Zr, Hf, Th, Ge, Sn, Pb, V, Nb, Ta, Cr, Mo, W as well as of the carbides, borides and silicides of the transition metals. Preferably such heat resistant catalyst-carrier materials are used which promote the effect of the actual catalytically active component synergistically. Examples for this are simple or compounded oxides, such as active $Al_2O_3$, $ZrO_2$, $Ce_2O_3$, $SiO_2$, $TiO_2$ or silicates such as barium-boron-or aluminosilicate or titanate, such as barium-or aluminum titanate.

In practice one will use as a heat resistant carrier material epecially the various phases of active aluminum oxide, which generally are designated as active aluminum oxide of the gamma-series ($\gamma$-, $\eta$-, $\delta$-, $\theta$ or $\rho$-, $\phi$-, and $\chi$-$Al_2O_3$). This aluminum oxide may be combined or doped with certain elements, which stabilize its crystalline structure or raise the capacity for absorption of oxygen of the total catalyst. According to a preferred embodiment of the process of the invention therefore, the surface of the tempered, structural reinforcer is brought into contact with an aqueous dispersion of aluminum oxide of the gamma series, or its hydroxide or hydrated oxide preliminary stages, containing possibly one or several salts of the elements from groups II, III and IV (main and secondary) of the periodic system. However, it is also possible to apply any other compound or preliminary stage of a compound, acting synergistically vis-a-vis the catalytically active component, by way of a dispersion to the reinforcer.

A doping of aluminum oxide of the gamma series with the elements cerium and/or zirconium has a favorable effect, for example, in case of automobile exhaust gas decontamination on the endurance activity and, beyond that, produces advantages wherein a smultaneous oxidation or reduction of the pollutants of internal combustion engines takes place in a single catalyst bed. In order to insert these doping elements into the aluminum oxide lattice, it turned out to be advantageous to produce an aluminum hydroxide or an aluminum oxihydrate preliminary stage, containing the elements cerium and/or zirconium, by co-precipitation of cerium zirconium- and possibly also aluminum salt containing solutions, and then to calcine the preliminary stage into the gamma-aluminum oxide-cerium-zirconium oxide matrix. Alternatively, a calcined $Al_2O_3$ of the gamma-series may be applied which contains $Ce_2O_3$ or $CeO_2$ and/or $ZrO_2$ or salts of the tri- or quadrivalent cerium and/or zirconium, and it may be calcined prior to or after application of the catalytically active component at a temperature of 500°–900° C. Preferably, this calcination takes place prior to the application of the catalytically active component. For the preparation of the dispersion of the heat-resistant carrier material known techniques are used, such as grinding processes, addition of anti-sedimentation agents, such as polyethylene imines stabilized beyond the pH-value and ammonium salts of polymer carboxylic acids (German AS No. 25 31 769), and aging processes are applied.

A favorable variation of the process, positively influencing the adhesion of certain catalysis-promoting carrier materials, provides for the heating of the smooth and corrugated layers or of the web of screen cloth provided with the support wires in an oxygen-containing gas under conditions of temperature and time, under which a surface layer of aluminum oxide develops from the aluminum contained in the alloy, whereby the smooth and corrugated layer or the web of screen cloth provided with support wires, after development of the aluminum oxide coating may further be coated with an additional catalysis-promoting carrier material of the same or of different composition, by way of the wash-coat process.

However, it is also possible to coat the smooth and corrugated layers or the web of screen cloth, provided with the supporting wires, first by way of the wash-coat process with catalysis-promoting carrier material and to heat the coated material then in an oxygen-containing gas under conditions of time and temperature, under which aluminum oxide oxidizes out of the aluminum contained in the alloy.

For the development of the surface layer of aluminum oxide, it will suffice to oxidize out aluminum oxide from the alloy by heating on the air at temperatures of 750°–1100°, preferably 500°–1000° C. and preferably during 1–7, especially about 4 hours.

The coated smooth and corrugated layers or the web of screen cloth provided with the supporting wires may be wound up into the cylinder with spiral-shaped cross section and the latter may be pressed under initial stress into a steel jacket and possibly welded onto it. It is an object of the invention therefore to provide a cylinder-shaped, carrier matrix, which may also be reinforced by a steel jacket, and coated with adhesive strength with a catalysis-promoting metal oxide, with spiral-shaped cross section, which is obtainable in accordance with the processing measures described.

Finally, the invention also pertains to the use of the carrier matrix explained, for the production of catalysts, preferably of noble metal and/or non-noble metal catalysts which are precipitated on catalysis-promoting carrier material as intermediate carriers, especially for the purification of the exhaust gases of internal combustion engines and industrial plants.

The advantages of the carrier matrixes of the invention as compared to known ceramics and metal catalyst carriers are as follows;
(a) an enlarged active surface;
(b) an improved hold-back capacity as compared to customary catalysis-promoting carrier substances, present in dipping dispersions;
(c) a decrease in the steps of the process during application of the catalysis-promoting carrier substances from dipping dispersions;
(d) an improvement of the catalyst effect because of the possibility of the cross flow of the exhaust gas to be purified with possibilities of exchange overlapping the free longitudinal channels;
(e) an improved heat exchange within the carrier matrix;
(f) a more simple production of the carrier matrix;
(g) lower material costs.

In the following the alternative embodiment of the carrier matrix of the invention, built from smooth screen cloth and supporting wires woven or or into it will be explained further on the basis of the attached drawing.

Figure 1B:
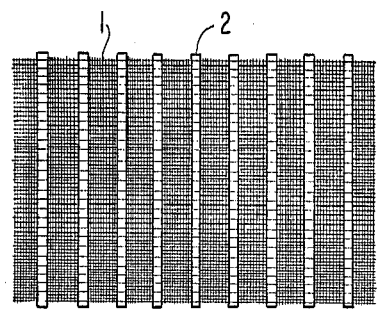
Figure 1C:
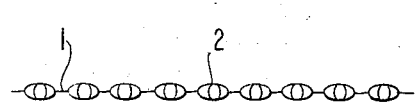

FIG. 1 shows a carrier matrix 6 according to the invention in a wound state. The carrier matrix 6 is produced from high temperature resistant and scale resistant steel. It consists of a smooth screen cloth 1, into which supporting or spacing wires 2 of a larger cross section than the screen cloth are woven in centrally at parallel intervals in the direction of the desired flow channels.

In case of an additional embodiment (FIG. 2) the carrier matrix 6 consists of a smooth screen cloth 1 onto which the supporting and spacing wires 2 are woven on.

Figure 2A:
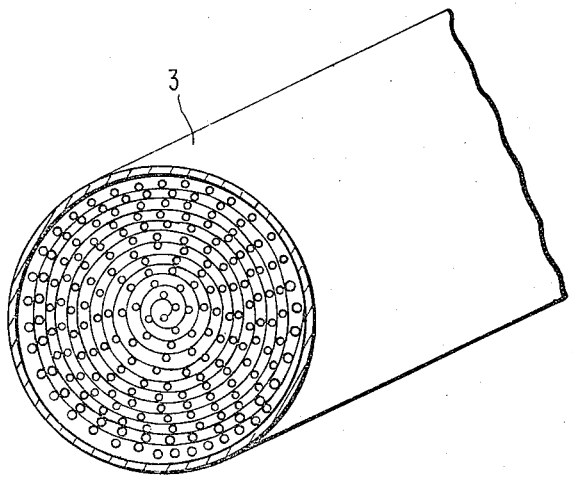
FIG. 2 shows a carrier matrix formed of smooth screen cloth, according to the invention, with woven-on supporting wires.
Figure 2B:
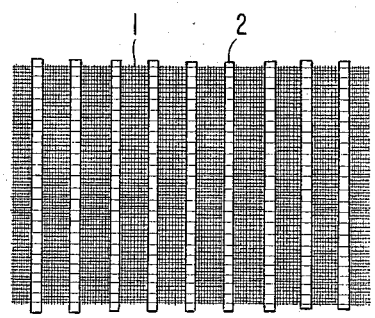
Figure 2C:
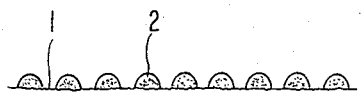

Additional variations of the embodiment may be produced in such a way, that the webs of screen cloth shown in FIGS. 1 and 2, with spacing wires, either with a smooth screen cloth or with smooth sheet metal or corrugated sheet metal are wound up into cylindrically wound carriers. The wound up carrier matrix 6 after reaching the required diameter, is encircled by a jacket 3.

In FIG. 3, bridges 4 are presented in the form of a cross, which serve as a mounting support of the carrier matrix 6 in the jacket 3. In case of an embodiment, the bridges 4 are welded on to the inside diameter of the jacket 3 while in case of another embodiment the bridges 5 are welded on to the conical converter lid 7. Length and diameter of the carrier matrix are variable depending on the requirements.

In the following examples of the embodiment the advantage of the simplified coatability of new carrier matrixes with dipping dispersions of catalysis-promoting carrier material is emphasized.

EXAMPLE 1

In case of a surface comparison of a metal carrier of the traditional kind (smooth and corrugated sheet metal) with a metal catalyst of the invention with smooth screen cloth and corrugated sheet metal an increase of surface of 26% resulted.

The screen cloth had a mesh size of 0.18 mm and a wire gauge of 0.1 mm, the thickness of the sheet amounted to 0.1 mm.

The two metal bodies were submerged into a 36.6% aqueous dispersion of $\gamma$-$Al_2O_3$, the channels were cleared by blowing and dried at 150° C.

The aluminum oxide absorption after two submersion processes amounted to:

| Plate-Carrier | | Screen Cloth/Plate Carrier |
| --- | --- | --- |
| 1st passage | 8 g | 16 g |
| 2nd passage | 6 g | 13 g |
| | 14 g | 29 g |

The number of submersion processes may thus be reduced to half.

In case of the use of a screen cloth mesh size of 0.09 mm and a wire gauge of 0.063 mm there results a surface enlargement of 39%.

EXAMPLE 2

In case of a comparison of a metallic body of the traditional type (smooth and corrugated sheet metal) with a metal catalyst of the invention with smooth screen cloth and corrugated screencloth of the dimensions given in example 1, there resulted a surface increase of 52%. The metal carrier was submerged into a pure 35.5% aqueous dispersion of $\gamma$-$Al_2O_3$, the channels were left open and it was dried at 150° C.

The absorption of aluminum oxide after one submersion was as follows:

| Sheet Metal Carrier | Screen Cloth Carrier |
| --- | --- |
| 8 g | 44 g |

The number of the submersions may thus be reduced even farther.

EXAMPLE 3

In comparing a metal carrier of the traditional type (smooth and corrugated sheet) with a metal catalyst of the invention with smooth screen cloth with supporting or spacing wires, there resulted approximately the same surface increase as in example 2 and thus also the same absorption of the dispersion. This carrier matrix, as compared to the matrixes used in examples 1 and 2 is additionally distinguished by a simpler production.

We claim:

1. In an apparatus for the purification of exhaust gases and the conversion of the harmful components thereof into harmless components, comprising a steel jacket or housing and having contained therein a catalyst effective for said conversion which catalyst is deposited on a carrier matrix for catalysts with flow channels passing therethrough, the improvement comprising a carrier matrix formed of alternately smooth and corrugated superimposed layers of high temperature resistant and scale resistant steel, wherein a layer of corrugated sheet metal alternates with a layer of smooth screen cloth, or one layer of smooth sheet metal alternates with a layer of corrugated screen cloth, or a layer of corrugated screen cloth alternates with a layer of smooth screen cloth, whereby a cross-flow effect of gases is obtained as well as enlarged geometric surface and improved retaining capacity with respect to catalysis promoting metal oxides present in a dip dispersion.

2. In an apparatus for the purification of exhaust gases and the conversion of the harmful components thereof into harmless components comprising a steel jacket or housing and having contained therein a catalyst effective for said conversion which catalyst is deposited on a carrier matrix for catalysts with flow channels passing therethrough, the improvement comprising a carrier matrix formed of superimposed layers of high temperature and scale resistant steel, wherein the layers are formed of a smooth screen cloth, into which supporting wires of a larger cross-section than the screen cloth are woven on or in, at parallel distances in the direction of the desired flow channels, or in the that layers of smooth screen cloth, or smooth or corrugated sheet metal alternate with layers of smooth screen cloth with supporting wires woven correspondingly in or on, whereby a cross-flow effect of gases is obtained as well as an enlarged geometric surface and improved retaining capacity with respect to catalysis promoting metal oxides present in a dip dispersion.

3. In an apparatus for the purification of exhaust gases and the conversion of the harmful components thereof into harmless components, comprising a steel jacket or housing and having contained therein a catalyst effective for said conversion which is a noble metal catalyst deposited on a catalyst promoting intermediate layer which is supported on a catalyst matrix for catalysts with flow channels passing therethrough, the improvement comprising a carrier matrix formed of alternately smooth and corrugated, superimposed layers of high temperature resistant and scale resistant steel, wherein a layer of corrugated sheet metal alternates with a layer of smooth screen cloth, or one layer of smooth sheet metal alternates with a layer of corrugated screen cloth, or a layer of corrugated screen cloth alternates with a layer of smooth screen cloth, whereby a cross-flow effect of gases is obtained as well as an enlarged geometric surface and improved retaining capacity with respect to catalysis promoting metal oxides present in a dip dispersion.

4. In an apparatus for the purification of exhaust gases and the conversion of the harmful components thereof into harmless components, comprising a steel jacket or housing and having contained therein a catalyst effective for said conversion which is a noble metal catalyst deposited on a catalyst promoting intermediate layer which is supported on a catalyst matrix for catalysts with flow channels passing therethrough, the improvement comprising a carrier matrix formed of superimposed layers of high temperature and scale resistant steel wherein the layers are formed of a smooth screen cloth into which supporting wires of a larger cross-section than the screen cloth are woven on or in at parallel distances in the direction of the desired flow channels, or in that layers of smooth screen cloth, or smooth or corrugated sheet metal alternate with layers of smooth screen cloth with supporting wires woven correspondingly in or on, whereby a cross-flow effect is obtained as well as an enlarged geometric surface and improved retaining capacity with respect to catalysis promoting metal oxides present in a dip dispersion.

5. In the apparatus of claims 1, 2, 3 or 4, wherein the matrix is in the form of a rolled up cylinder of the said superimposed layers and are pressed or welded into the jacket or housing.

6. In the apparatus of claims 1, 2, 3 or 4, wherein the matrix is in the form of a rolled up cylinder of the said superimposed layers and are fixed in the jacket or housing by mooring rings or holding bars.

* * * * *